US010253221B2

(12) United States Patent
Funaki et al.

(10) Patent No.: US 10,253,221 B2
(45) Date of Patent: Apr. 9, 2019

(54) ADHESIVE

(71) Applicant: AGC Inc., Chiyoda-ku (JP)

(72) Inventors: Atsushi Funaki, Chiyoda-ku (JP);
Norihide Sugiyama, Chiyoda-ku (JP)

(73) Assignee: AGC Inc., Chuyoda-ku (CN)

( * ) Notice: Subject to any disclaimer, the term of this patent is extended or adjusted under 35 U.S.C. 154(b) by 0 days.

(21) Appl. No.: 15/068,725

(22) Filed: Mar. 14, 2016

(65) Prior Publication Data

US 2016/0194528 A1    Jul. 7, 2016

Related U.S. Application Data

(63) Continuation of application No. PCT/JP2014/079118, filed on Oct. 31, 2014.

(30) Foreign Application Priority Data

Nov. 5, 2013  (JP) ................................. 2013-229229

(51) Int. Cl.
*C09J 127/20*   (2006.01)
*C09J 127/18*   (2006.01)
*C09J 127/16*   (2006.01)
*B29C 35/02*    (2006.01)
*C09J 5/06*     (2006.01)
B29K 27/12      (2006.01)
B29K 27/18      (2006.01)
B29L 9/00       (2006.01)

(52) U.S. Cl.
CPC ............ *C09J 127/20* (2013.01); *B29C 35/02* (2013.01); *C09J 5/06* (2013.01); *C09J 127/16* (2013.01); *C09J 127/18* (2013.01); *B29K 2027/12* (2013.01); *B29K 2027/18* (2013.01); *B29L 2009/00* (2013.01); *C09J 2400/163* (2013.01); *C09J 2427/00* (2013.01)

(58) Field of Classification Search
CPC combination set(s) only.
See application file for complete search history.

(56) References Cited

U.S. PATENT DOCUMENTS

| 4,243,770 A | 1/1981 | Tatemoto et al. |
| 4,361,678 A | 11/1982 | Tatemoto et al. |
| 4,387,168 A | 6/1983 | Morita |
| 5,102,965 A * | 4/1992 | Carlson ................. C08F 210/06 526/206 |
| 5,439,980 A * | 8/1995 | Yutani ..................... C08F 2/00 525/267 |
| 6,479,161 B1 * | 11/2002 | Araki ....................... B32B 1/08 428/500 |
| 8,835,551 B2 * | 9/2014 | Fukushi .................. C08F 14/16 524/544 |
| 2007/0037922 A1 | 2/2007 | Tanaka et al. |
| 2010/0286329 A1 | 11/2010 | Fukushi et al. |
| 2011/0028655 A1 | 2/2011 | Tanaka et al. |
| 2013/0109790 A1 | 5/2013 | Fukushi et al. |
| 2014/0227532 A1 * | 8/2014 | Lochhaas ............... B32B 15/06 428/421 |

FOREIGN PATENT DOCUMENTS

| EP | 0 399 543 A2 | 11/1990 |
| EP | 0 399 543 A3 | 11/1990 |
| EP | 1 666 524 A1 | 6/2006 |
| JP | 53-125491 | 11/1978 |
| JP | 56-57811 | 5/1981 |
| JP | 57-59972 | 4/1982 |
| JP | 61-12924 | 4/1986 |
| JP | 5-163474 | 6/1993 |
| JP | 7-62313 | 3/1995 |
| JP | 7-62313 A | 3/1995 |
| JP | 07-062313 A | 3/1995 |
| JP | 8-134422 | 5/1996 |
| JP | 8-259703 | 10/1996 |
| JP | 11-80271 A | 3/1999 |
| JP | 2004-256820 | 9/2004 |
| JP | 2005-350529 A | 12/2005 |
| JP | 2010-539295 | 12/2010 |
| JP | 2012-17431 | 1/2012 |
| WO | WO-2013123156 A1 * | 8/2013 ................ C08J 7/08 |

OTHER PUBLICATIONS

International Search Report dated Jan. 13, 2015 in PCT/JP2014/079118 filed Oct. 31, 2014.
Supplementary European Search Report dated Mar. 27, 2017 in Patent Application No. 14 86 0412.

* cited by examiner

*Primary Examiner* — Nicole M. Buie-Hatcher
(74) *Attorney, Agent, or Firm* — Oblon, McClelland, Maier & Neustadt, L.L.P.

(57) ABSTRACT

To provide an adhesive excellent in heat resistance and adhesive property. An adhesive comprising a fluorinated polymer having a weight average molecular weight (Mw) of from $6 \times 10^3$ to $3 \times 10^4$ and having iodine atoms at both terminals, and a radical generator. The fluorinated polymer has structural units derived from at least one monomer selected from the group consisting of tetrafluoroethylene, vinylidene fluoride, hexafluoropropylene and a perfluoro (alkyl vinyl ether).

18 Claims, No Drawings

ADHESIVE

TECHNICAL FIELD

The present invention relates to an adhesive which is excellent in heat resistance and adhesive property.

BACKGROUND ART

A structural adhesive is used for bonding metal members, etc. in various fields such as the field of automobile and vehicle industry, the field of shipping industry, the field of aerospace industry and the field of civil engineering and construction industry. As the structural adhesive, a curable epoxy adhesive having an epoxy resin as the main component modified or blended with an elastomer or the like is widely used in the above fields. However, if the bonded portion is heated and exposed to a high temperature due to conditions for use, a conventional curable epoxy adhesive is insufficient in heat resistance. Thus, it has been studied to improve heat resistance of a curable epoxy adhesive (for example, Patent Document 1).

Further, although a fluorinated polymer is known as a resin excellent in heat resistance, in general it is difficult to obtain a sufficient adhesive property. Regarding this problem, a technique to improve adhesive property of a fluorinated polymer so as to be used for an adhesive is known (for example, Patent Document 2).

On the other hand, it is known that a cured product can be formed by copolymerizing tetrafluoroethylene, vinylidene fluoride, hexafluoropropylene, a perfluoro alkyl vinyl ether, etc. in the presence of a perfluoroalkyl diiodide to obtain a polymer having iodine atoms bonded to both terminals, followed by peroxide crosslinking with a triallyl isocyanurate or the like (for example, Patent Document 3).

PRIOR ART DOCUMENTS

Patent Documents

Patent Document 1: JP-A-H05-163474
Patent Document 2: JP-A-2004-256820
Patent Document 3: JP-B-S61-12924

DISCLOSURE OF INVENTION

Technical Problem

Along with the increase of variety of applications of adhesives, an adhesive having heat resistance and adhesive property superior to conventional heat resistant adhesives is desired. However, if the adhesive mentioned in Patent Document 1 is used for, e.g. a construction method (weld-bonding construction method) in which spot welding and the adhesive are used in combination, the heat resistance required for the temperature increase due to spot welding is insufficient. Further, the adhesive mentioned in Patent Document 2 is insufficient in adhesive property and heat resistance.

It is an object of the present invention to provide an adhesive excellent in heat resistance and adhesive property so as to overcome the above problem.

Solution to Problem

The specific means to solve the above problem are as follows.

The first embodiment of the present invention is an adhesive comprising a fluorinated polymer having a weight average molecular weight (Mw) of from $6 \times 10^3$ to $3 \times 10^4$ and having iodine atoms at both terminals, and a radical generator. The second embodiment of the present invention is a method for bonding a first member and a second member, which comprises a step of applying the adhesive between the first member and the second member to obtain a laminate, and a step of subjecting the obtained laminate to heat treatment.

The third embodiment of the present invention is a method for producing an adhered body, which comprises a step of applying the adhesive between a first member and a second member to obtain a laminate, and a step of subjecting the obtained laminate to heat treatment.

Advantageous Effects of Invention

According to the present invention, an adhesive which is excellent in heat resistance and adhesive property can be provided.

DESCRIPTION OF EMBODIMENTS

In the present invention, the term "step" includes not only an independent step but also a step which cannot be clearly distinguished from another step, so long as the original object of the step can be accomplished. Further, the expression "to" showing the numerical range is used to include the numerical values before and after thereof as the lower limit value and the upper limit value. Further, in a case where plural substances corresponding to each component are contained in a composition, the content of each component in the composition means the total amount of the plural substances contained in the composition, unless otherwise specified.

<Adhesive>

The adhesive of the present invention comprises a fluorinated polymer having a weight average molecular weight (Mw) of $6 \times 10^3$ to $3 \times 10^4$ and having iodine atoms at both terminals (hereinafter simply referred to also as "fluorinated polymer"), and a radical generator.

The adhesive comprises a fluorinated polymer having the specific weight average molecular weight and having iodine atoms at both terminals, and a radical generator, whereby the heat resistance and adhesive property are excellent. The adhesive is particularly excellent in adhesive property with a metal and particularly excellent in heat resistance and adhesive property in a case where metals are bonded to each other.

Fluorinated Polymer

The weight average molecular weight (Mw) of the fluorinated polymer contained in the adhesive is from $6 \times 10^3$ to $3 \times 10^4$. If the weight average molecular weight is less than $6 \times 10^3$, the sufficient adhesive property tends not to be obtained. Further, if the weight average molecular weight exceeds $3 \times 10^4$, the viscosity of the adhesive increases, and thereby the working efficiency tends to deteriorate. The weight average molecular weight of the fluorinated polymer is preferably from $6 \times 10^3$ to $2.5 \times 10^4$, more preferably from $8 \times 10^3$ to $2.5 \times 10^4$, further preferably from $8 \times 10^3$ to $2 \times 10^4$, most preferably from $1.4 \times 10^4$ to $2 \times 10^4$, from the viewpoint of the adhesive property and working efficiency. Further, in a case where the fluorinated polymer is a polymer having structural units derived from VdF and structural units derived from HFP, the weight average molecular weight is particularly preferably at least $8\times10^3$, from the viewpoint of the adhesive property and working efficiency.

The molecular weight distribution (Mw/Mn) of the fluorinated polymer, which is a ratio of the weight average molecular weight (Mw) to the number average molecular weight (Mn) is preferably from 1.00 to 1.40, more preferably from 1.00 to 1.35, from the viewpoint of the adhesive property and heat resistance. When the molecular weight distribution falls within the above range, the heat resistance and adhesive property tend to be further improved.

The weight average molecular weight and the number average molecular weight of the fluorinated polymer can be measured by usual GPC. Specifically, GPC can be measured by using e.g. HLC-8220GPC manufactured by TOSOH CORPORATION, as described below. As a column, one column of TSKguardcolumn MP (XL) (inner diameter: 6 mm, length: 4 cm) manufactured by TOSOH CORPORATION and two columns of TSKgeI MultiporeHXL-M (inner diameter: 7.8 mm, length: 30 cm) are connected in series for use. A sample to be measured is prepared by diluting a fluorinated polymer with tetrahydrofuran so as to be a 1.0 to 1.5 mass % solution, tetrahydrofuran is used as an eluting solution, and the fluorinated polymer is eluted at a rate of 1 ml/min by setting the temperature of a column oven and an inlet oven at 40° C. Polarity of a differential refraction detecting part is set to be negative for detection, and GPC is measured. The weight average molecular weight and the number average molecular weight of a fluorinated polymer are calculated as the molecular weight of a polymethyl methacrylate.

The weight average molecular weight and the number average molecular weight (hereinafter referred to also as simply "molecular weight" together) of a fluorinated polymer can be controlled by a conventional method. Specifically, for example, in the after-described process for producing a fluorinated polymer, the molecular weight may be increased by reducing the amount of an iodide compound to be charged. On the other hand, by increasing the amount of an iodide compound to be charged, the molecular weight can be lowered.

The fluorinated polymer is not particularly restricted, so long as the fluorinated polymer is a polymer having iodine atoms at both terminals and having at least one type of structural units derived from a fluorinated monomer having at least one fluorine atom (hereinafter referred to also as simply "fluorinated monomer"). Here, the structural units derived from a fluorinated monomer are partial structures contained in the fluorinated polymer and partial structures formed by polymerization reaction of the fluorinated monomer with another monomer. Further, having iodine atoms at both terminals means having iodine atoms bonding to respective carbon atoms of both terminals of the main chain formed by a polymerizable group of a monomer.

The fluorinated polymer is preferably a straight-chain polymer having one iodine atom at each of both terminals and at least one fluorine atom in the main chain. The straight-chain polymer means that a partial structure formed from a polymerizable group in a monomer constituting the fluorinated polymer is a straight-chain and may have a side chain derived from a partial structure other than the polymerizable group of the monomer.

The fluorinated polymer may be a homopolymer obtained by polymerizing only one type of a fluorinated monomer or may be a copolymer obtained by polymerizing at least two types of monomers. In a case where the fluorinated polymer is a copolymer, at least one type of monomers constituting the copolymer has at least one fluorine atom.

The fluorinated monomer is not particularly restricted, so long as the fluorinated monomer has at least one fluorine atom and a polymerizable group (preferably an ethylenic unsaturated group). As a specific example of the fluorinated monomer, tetrafluoroethylene (hereinafter referred to also as "TFE"), vinylidene fluoride (hereinafter referred to also as "VdF"), hexafluoropropylene (hereinafter referred to also as "HFP"), perfluoro(alkyl vinyl ether) (hereinafter referred to also "PAVE"), chlorotrifluoroethylene, trifluoroethylene, trifluoropropylene or tetrafluoropropylene may be mentioned. Among them, PAVE may, for example, be the compound represented by the following formula (I):

$$CF_2=CFOR_f \qquad (I)$$

wherein $R_f$ is a $C_{1-8}$ perfluoroalkyl group, w-hydroperfluoroalkyl group or a poly(perfluoroalkyleneoxy) fluoroalkyl group. The poly(perfluoroalkyleneoxy) fluoroalkyl group is preferably the following formula (Ia):

$$-(R^1O)_pR^2 \qquad (Ia)$$

wherein $R^1$ is a $C_{1-4}$ perfluoroalkyl group, and $R^2$ is a $C_{1-4}$ perfluoroalkyl group. p is a numerical number of from 1 to 3. When p is at least 2, plural $R^1$ may be the same or different.

The fluorinated polymer may have structural units derived from a monomer having no fluorine atom. The monomer having no fluorine atom is not particularly restricted, so long as the monomer can be copolymerized with the fluorinated monomer. As the monomer having no fluorine atom, specifically, ethylene (hereinafter referred to also as "E"), propylene (hereinafter referred to also as "P") or a $C_{2-4}$ olefin such as butene may be mentioned.

The fluorinated polymer is preferably a polymer having structural units derived from at least one monomer selected from the group consisting of TFE, VdF, HFP and PAVE, more preferably a polymer having structural units derived from at least two monomers selected from the group consisting of TFE, VdF, HFP and PAVE, and further preferably a polymer having structural units derived from VdF and structural units derived from HFP. Further, a polymer having structural units derived from TFE and structural units derived from P is also preferred.

In a case where the fluorinated polymer has structural units derived from VdF and structural units derived from HFP, the content ratio (HFP/VdF) of the structural units derived from VdF to the structural units derived from HFP is preferably from 0.4 to 1.0, more preferably from 0.5 to 0.8, further preferably from 0.6 to 0.7 based on mass from the viewpoint of the adhesive property and heat resistance. In a case where the fluorinated monomer has structural units derived from TFE and structural units derived from P, the content ratio (P/TFE) of the structural units derived from P to the structural units derived from TFE is preferably from 0.2 to 1.0, further preferably from 0.3 to 0.4 based on mass.

The composition of the fluorinated polymer may be measured by a known method such as NMR or may be considered as the same composition of mixed gas monomers to be continuously charged after starting polymerization.

Further, the composition of the mixed gas monomer can be determined so as to be the same ratio as the composition of the fluorinated polymer to be formed by calculating the composition of the fluorinated polymer to be formed based on the composition of respective monomers to be charged before starting polymerization and the reactivity ratio of the respective monomers.

The content of fluorine atoms contained in the fluorinated polymer is not particularly restricted. The content of fluorine atoms in the fluorinated polymer is preferably at least 10 mass %, more preferably from 20 to 75 mass %, further preferably from 30 to 75 mass % in the total mass of the fluorinated polymer from the viewpoint of the adhesive property and heat resistance.

As a specific example of the fluorinated polymer, a fluorinated polymer having structural units derived from VdF and structural units derived from HFP and having iodine atoms at both terminals; a fluorinated polymer having structural units derived from TFE, structural units derived from VdF and structural units derived from HFP and having iodine atoms at both terminals; a fluorinated polymer having structural units derived from TFE and structural units derived from HFP and having iodine atoms at both terminals; a fluorinated polymer having structural units derived from TFE and structural units derived from PAVE and having iodine atoms at both terminals; a fluorinated polymer having structural units derived from VdF and structural units derived from PAVE and having iodine atoms at both terminals; and a fluorinated polymer having structural units derived from TFE and structural units derived from P and having iodine atoms at both terminals may be mentioned.

The adhesive may have only one type of the fluorinated polymer or may have at least 2 types of the fluorinated polymers in combination.

Process for Producing a Fluorinated Polymer

For example, a fluorinated polymer having iodine atoms at both terminals may be produced by the production process described in JP-B-S61-12924. Specifically, a fluorinated polymer having iodine atoms at both terminals can be produced by radical polymerizing a monomer composition containing a fluorinated monomer in the presence of an iodine compound. The iodine compound may, for example, be iodine ($I_2$) or a compound represented by the following formula (II). It is considered that these iodine compounds, for example, have a function as a chain transfer agent.

$$I-R^1_f-I \quad (II)$$

wherein $R^1_f$ is a $C_{1-8}$ perfluoroalkylene group or a poly(perfluoroalkyleneoxy) fluoroalkylene group. The poly(perfluoroalkyleneoxy) fluoroalkylene group is preferably represented by the following formula (IIa):

$$-(R^{21}O)_q R^{22}- \quad (IIa)$$

wherein each of $R^{21}$ and $R^{22}$ which are independent of each other is a $C_{1-4}$ perfluoroalkylene group. q is a numerical number of from 1 to 4. When q is at least 2, plural $R^{21}$ may be the same or different.

The compound represented by the formula (II) may, for example, be specifically 1,4-diiode perfluorobutane, or 1,6-diiode perfluorohexane.

The construction of the monomer composition containing a fluorinated monomer to be used for producing a fluorinated polymer may be appropriately selected depending on the object, etc.

Further, the amount of the iodine compound to be used for the monomer composition is not particularly restricted. For example, the amount of the iodine compound to be used may be from 0.05 to 20 mass % based on the total mass of the monomer composition.

The radical initiator is preferably used in the process for producing a fluorinated polymer. The radical initiator is not particularly restricted and may be appropriately selected from conventionally used radical initiators. Specifically, the radical initiator may, for example, be an organic peroxide such as diisopropyl peroxydicarbonate (hereinafter referred to also as "IPP"), tert-butyl peroxypivalate (hereinafter referred to also as "PBPV") or di-tert-butyl peroxide; or an azo compound such as 2,2'-azobis(2-methyl butyronitrile) or 2,2'-azobisisobutyronitrile.

In a case where the radical initiator is used, the amount of the radical initiator to be used is appropriately selected as the case requires.

The radical polymerization may be carried out by any method such as a solution polymerization method, a suspension polymerization method or an emulsion polymerization method. In the case of the solution polymerization or the suspension polymerization, as a solvent, a perfluoroalkane having a low chain transfer constant, a hydrofluoroalkane or the like may be preferably used. Further, an emulsifying agent used for the emulsion polymerization, a fluorine type emulsifying agent is preferably used.

For example, the radical polymerization is carried out at a reaction temperature of from 30 to 100° C. for a reaction time of from 1 to 20 hours.

The content of the fluorinated polymer contained in the adhesive can be appropriately adjusted depending on the object, etc. For example, the content of the fluorinated polymer is preferably at least 30 mass % more preferably at least 50 mass %, in the total mass of the adhesive. The upper limit value of the content of the fluorinated polymer contained in the adhesive is not particularly restricted. For example, the content of the fluorinated polymer is limited to at most 99.9 mass % in the total mass of the adhesive.

The adhesive may contain a fluorinated polymer other than the fluorinated polymer having iodine atoms at both terminals. Such another fluorinated polymer may, for example, be a fluorinated polymer having no iodine atom, a fluorinated polymer having only one iodine atom, a fluorinated polymer having an iodine atom at a part other than the terminals or a fluorinated polymer having at least 3 iodine atoms. Such another fluorinated polymer may be a fluorinated polymer to be by-produced in the process for producing the fluorinated polymer having iodine atoms at both terminals.

In a case where the adhesive contains another fluorinated polymer, the content of another fluorinated polymer is preferably at most 50 mass %, more preferably at most 30 mass %, in the total mass of the adhesive. For example, the lower limit of the content of another fluorinated polymer is set to be 1 mass %.

Radical Generator

The adhesive contains at least one type of a radical generator. The radical generator may, for example, be an organic peroxide, an inorganic peroxide or an azo compound. At least one type of the radical generator may be used alone or at least 2 types may be used in combination. Among them, the adhesive preferably contains at least one type of organic peroxides, from the viewpoint of the heat resistance and adhesive property.

The organic peroxide may, for example, be bis(perfluorobenzoyl) peroxide, 1,1-bis(tert-butylperoxy)-3,5,5-trimethylcyclohexane, 2,5-dimethylhexane-2,5-dihydroxy peroxide, di-tert-butyl peroxide, tert-butylcumyl peroxide, dicumyl peroxide, α,α'-bis(tert-butylperoxy)-p-diisopropylbenzene, 2,5-dimethyl-2,5-bis(tert-butylperoxy)hexyne-3, benzoyl peroxide, tert-butylperoxybenzene, 2,5-dimethyl-2,5-bis(benzoylperoxy)hexane, tert-butylperoxy maleic acid, tert-butylperoxyisopropylcarbonate, peracetic acid or m-chloroperbenzoic acid. Among them, a neutral peroxide is preferably used such as bis(perfluorobenzoyl) peroxide, 1,1-bis(tert-butylperoxy)-3,5,5-trimethylcyclohexane, 2,5-dimethylhexane-2,5-dihydroxy peroxide, di-tert-butyl peroxide, tert-butylcumyl peroxide, dicumyl peroxide, α,α'-bis (tertert-butylperoxy)-p-diisopropylbenzene, 2,5-dimethyl-2,5-bis(tert-butylperoxy)hexyne-3, benzoyl peroxide, tert-butylperoxybenzene, 2,5-dimethyl-2,5-bis(benzoylperoxy)hexane, tert-butylperoxy maleic acid or tert-butylperoxyisopropyl carbonate.

The inorganic peroxide may, for example, be hydrogen peroxide; or a persulfate such as sodium persulfate or potassium persulfate.

The azo compound may, for example, be 2,2'-azobis(2-methylbutyronitrile) or 2,2'-azobisisobutyronitrile.

The content of the radical generator in the adhesive is from 0.1 to 10 mass %, preferably from 0.5 to 5.0 mass %, per the total mass of the fluorinated polymer.

Compound Having at Least 2 Ethylenic Unsaturated Groups

The adhesive preferably contains at least one type of a compound (hereinafter referred to also as "crosslinking coagent") having at least 2 ethylenic unsaturated groups, in addition to the fluorinated polymer and the radical generator. When the adhesive contains a compound having at least 2 ethylenic unsaturated groups, the heat resistance and adhesive property tend to be further improved. The ethylenic unsaturated group may, for example, be a vinyl group, an allyl group, a (meth)acrylic group, or maleimide group. Further, the crosslinking coagent may be a compound having an alkynyl group instead of the ethylenic unsaturated group.

The crosslinking coagent may, for example, be triallyl cyanurate, triallyl isocyanurate, triacryl formal, triallyl trimellitate, N,N'-m-phenylene bismaleimide, dipropargyl terephthalate, diallyl phthalate or tetraallyl terephthalamide. One type of the crosslinking coagent may be used alone, or two or more types may be used in combination.

In a case where the adhesive contains the crosslinking agent, the content of the crosslinking agent is, for example, from 1 to 40 mass %, preferably from 10 to 30 mass %, per the total mass of the polymer.

Another Component

The adhesive may contain another component as the case requires, in addition to the fluorinated polymer and radical generator. Such another component may, for example, be a solvent, a plasticizer, a viscosity modifier, a flexibilizer, an inorganic filler, an adhesion accelerator or a silane coupling agent. Such another component may be used alone, or two or more types may be used in combination.

Volatile Component

The adhesive may contain a volatile component. In a case where the adhesive contains a volatile component, the content of the volatile component is not particularly restricted. The upper limit value of the content of the volatile component is preferably at most 50 mass %, more preferably at most 30 mass %, further preferably at most 10 mass %, from the viewpoint of the adhesive property and heat resistance. The lower limit value of the content of the volatile component is, for example, at least 1 mass %.

Here, the content of the volatile component is calculated from the mass reduction, when an adhesive is left under a condition of 150° C. and 0.1 MPa.

Object to be Bonded

The object to be bonded is not particularly restricted. The object to be bonded may, for example, be specifically a metal such as iron, stainless steel, carbon steel or aluminum, a metal material such as an alloy or a metal oxide; a silicon material such as glass, monocrystal silicon, polycrystal silicon, amorphous silicon or silicon oxide; a plastic such as a polycarbonate or a carbon material such as carbon fiber. Among them, the object to be bonded is preferably the metal material such as a metal, an alloy or a metal oxide. That is, the adhesive is preferably used for bonding a metal.

The shape of the object to be bonded is not particularly restricted, so long as the object has a shape which can be bonded. The object to be bonded may, for example, be specifically a metal plate.

Bonding Method

The adhesive is used in a method for bonding a first member and a second member, which comprises a step of applying the adhesive between the first member and the second member to obtain a laminate, and a step of subjecting the obtained laminate to heat treatment.

The materials of the first member and the second member which are objects to be bonded are not particularly restricted, and the materials are appropriately selected from the materials described in the above object to be bonded. Further, the materials of the first member and the second member may be the same or different.

The step to obtain a laminate may, for example, comprise applying an adhesive on at least one surface of a first member and a second member and making the surface of the member applied with the adhesive be in contact with the other member. In a case where the adhesive is applied to both the first member and the second member, it is preferred to bring the surfaces applied with the adhesive into contact each other.

The method for applying an adhesive is not particularly restricted, and it can be appropriately selected from applying methods usually used. For example, an applying method such as spray coating, brush coating, dipping, roller coating, flow coater coating or die coating may be mentioned.

The amount of an adhesive to be applied is not particularly restricted and appropriately selected depending on the object, etc. For example, the amount of an adhesive to be added is at least 1 $g/m^2$, preferably from 1 to 100 $g/m^2$.

The condition of the heating treatment for a laminate is not particularly restricted and can be appropriately selected depending on the construction of the polymer, the object to be bonded, etc. The condition of the heating treatment is, for example, from 60 to 200° C. for 0.5 to 6 hours. The heating treatment may be carried out one time, or may be carried out plural times while changing the temperature. It is preferred to carry out the heating treatment plural times while changing the temperature, from the viewpoint of the heat resistance and adhesive property.

Further, pressure is preferably applied on a laminate at the time of the heating treatment. Pressure is applied to the lamination direction of the first member, the adhesive and the second member. Pressure to be applied is appropriately selected depending on the object, the material of the member, etc. The pressure is, for example, from 0.1 MPa to 1 MPa.

The adhesive to be used for the bonding method comprises the fluorinated polymer and the radical generator, whereby an adhered body having a first member and a second member which are adhered and obtained by the adhering method is excellent in the adhesive strength between the members and the heat resistance.

EXAMPLES

Now, the present invention is described in detail with reference to Examples, but it should be understood that the present invention is by no means restricted by these Examples. Further, otherwise not particularly restricted, "%" is the standard by mass.

[Method for Measuring Molecular Weight]

GPC was measured by using HLC-8220GPC (manufactured by TOSOH CORPORATION), and the weight average molecular weight and the number average molecular weight of the fluorinated polymer were calculated based on the standard sample of the polymethylmethacrylate as the molecular weight converted value. GPC was measured under the following condition.

Column: consisting of one TSKguardcolumn MP(XL) (inner diameter: 6 mm, length: 4 cm, manufactured by TOSOH CORPORATION) and two TSK gel Multipore-HXL-M (inner diameter: 7.8 mm, length: 30 cm, manufactured by TOSOH CORPORATION) connected in series.

Sample to be measured: 1.0 to 1.5 mass % tetrahydrofuran solution. 50 μL

Eluting solution: tetrahydrofuran, 1 ml/min.

Column and inlet temperature: 40° C.

Detection: detected by a differential reflectometer by setting polarity to negative

[Method for Measuring Adhesive Strength]

A prepared adhesive sample was uniformly and thinly applied on a metal sample piece having a thickness of 0.5 mm, a width of 1.0 cm and a length of 6.0 cm at region between the end of the long side and 0.5 cm from the end. Then, the metal test piece was deposited on a metal test piece made of the same material and having the same size so that the end of the long side direction would be deposited on only the part applied with the adhesive, and the overlapped parts (adhered surface) were fixed by clips to obtain a laminate. The heating treatment was carried out by keeping the obtained laminate in an oven at 80° C. for 1 hour, at 100° C. for 1 hour, at 120° C. for 1 hour and at 150° C. for 2 hours. Then, the laminate was cooled to room temperature, the clips were removed, and thereby an adhered body consisting of both the metal pieces bonded was prepared. The adhered body was used as a test sample.

Both ends of the long side direction of the test sample were fixed with jigs of a tensile tester (TENSILON RTC-1210, manufactured by ORIENTEC Co., LTD.), and both ends were pulled toward the long side direction at a rate of 200 mm/min to measure the maximum strength at the time of peeling the bonded surface.

Further, the metal test piece was made of aluminum.

Further, the adhesive strength is preferably at least 130 N, more preferably at least 160 N. When the adhesive strength falls within the above range, the adhesive property is considered to be excellent.

[Heat Resistance Test]

The heat resistance test was carried out by leaving the test sample prepared in the method for measuring the adhesive strength with a load of 200 g for 30 days under an environment of 200° C., and then whether the test sample was peeled or not was visually observed. Evaluation was carried out based on the following evaluation standard.

Evaluation Standard

A: The bonded surface was not peeled at all.

B: The bonded surface was partially peeled.

C: The bonded surface was completely peeled.

Preparation Example 1

A pressure resistant container having a capacity of 200 ml and provided with a stirrer was deaerated, and 195 g of tridecafluorohexane ($CF_3(CF_2)_5H$; hereinafter referred to also as "C6H"), 1.5 g of diiode perfluorobutane ($I(CF_2)_4I$; hereinafter referred to also as "C4I2"), 23.5 g of hexafluoropropylene (HFP) and 8.2 g of vinylidene fluoride (VdF) were charged into the pressure resistant container. The internal temperature was maintained at 66° C., 4.5 ml of a 2.5% C6H solution of tert-butylperoxypivalate (PBPV) was charged to initiate polymerization. A mixed gas monomer of HFP/VdF=22/78 in a molar ratio was continuously charged so as to keep the pressure constant. When the charged mixed gas became 25.0 g, the internal temperature was cooled to room temperature, unreacted monomers were purged to terminate the polymerization, and 26.6 g of a fluorinated polymer 1 was obtained. The content ratio (HFP/VdF) of the structural units derived from VdF to the structural units derived from HFP in the fluorinated polymer 1 was 0.66 based on mass.

The number average molecular weight and the weight average molecular weight of the obtained fluorinated polymer 1 were measured by the above described method for measuring the molecular weight. The weight average molecular weight (Mw) was 11,090, the number average molecular weight (Mn) was 8,660, and the molecular weight distribution Mw/Mn was 1.28.

Preparation Example 2

A pressure resistant container having a capacity of 200 ml and provided with a stirrer was deaerated, and 195 g of C6H, 0.8 g of C4I2, 23.5 g of HFP and 8.2 g of VdF were charged into the pressure resistant container. The internal temperature was maintained at 66° C., 4.5 ml of a 2.5% C6H solution of PBPV was charged to initiate polymerization. A mixed gas monomer of HFP/VdF=22/78 in a molar ratio was continuously charged so as to keep the pressure constant. When the charged mixed gas became 20.0 g, the internal temperature was cooled to room temperature, unreacted monomers were purged to terminate the polymerization, and 19.5 g of a fluorinated polymer 2 was obtained. The content ratio HFP/VdF of the fluorinated polymer 2 was 0.66 based on mass.

The number average molecular weight and the weight average molecular weight of the obtained fluorinated polymer 2 were measured by the above described method for measuring the molecular weight. The weight average molecular weight (Mw) was 19,540, the number average molecular weight (Mn) was 16,220, and the molecular weight distribution Mw/Mn was 1.20.

Preparation Example 3

A pressure resistant container having a capacity of 200 ml and provided with a stirrer was deaerated, and 195 g of C6H, 3.0 g of C4I2, 23.5 g of HFP and 8.2 g of VdF were charged into the pressure resistant container. The internal temperature was maintained at 40° C., 6.0 ml of a 2.5% C6H solution of diisopropylperoxydicarbonate (IPP) was charged to initiate polymerization. A mixed gas monomer of HFP/VdF=22/78 in a molar ratio was continuously charged so as to keep the pressure constant. When the charged mixed gas became 25.0 g, the internal temperature was cooled to room temperature, unreacted monomers were purged to terminate the polymerization, and 27.9 g of a fluorinated polymer C1 was obtained. The content ratio HFP/VdF of the fluorinated polymer C1 was 0.66 based on mass.

The number average molecular weight and the weight average molecular weight of the obtained fluorinated polymer C1 were measured by the above described method for measuring the molecular weight. The weight average molecular weight (Mw) was 5450, the number average molecular weight (Mn) was 4,720, and the molecular weight distribution Mw/Mn was 1.15.

Preparation Example 4

A pressure resistant container having a capacity of 200 ml and provided with a stirrer was deaerated, a liquid prepared by dissolving 0.6 g of ammonium persulfate, 2.4 g of sodium hydrogen phosphate, 1.5 g of ammonium perfluorooctanoate, 12.2 g of tertiary butanol, 0.017 g of ferrous sulfate heptahydrate and 0.022 g of ethylenediaminetetraacetic acid in 85 g demineralized water, was charged in the pressure resistant container. 1.5 g of C4I2 was charged, and 9.8 g of TFE and 0.8 g of P were charged. The internal temperature was maintained at 25° C., 0.5 ml of a 1 mass % Rongalite aqueous solution was charged to initiate polymerization. Then, in every 15 minutes, a 1 mass % Rongalite aqueous solution was charged, and the total 14 ml was charged. A mixed gas monomer of P/TFE=44/56 in a molar ratio was continuously charged so as to keep the pressure constant. When the charged mixed gas became 15.0 g, the internal temperature was cooled to room temperature, unreacted monomers were purged to terminate the polymerization, and 15.9 g of a fluorinated polymer 4 was obtained.

The content ratio (P/TFE) of the structural units derived from P to the structural units derived from TFE in the fluorinated polymer 4 was 0.33 based on mass.

The number average molecular weight and the weight average molecular weight of the obtained fluorinated polymer 4 were measured by the above described method for measuring the molecular weight. The weight average molecular weight (Mw) was 8,510, the number average molecular weight (Mn) was 6,450, and the molecular weight distribution Mw/Mn was 1.32.

Preparation Example 5

The polymerization was carried out in the same manner as in Preparation Example 4, except that the amount of C4I2 to be charged was changed to 3.0 g, and 16.6 g of a fluorinated polymer 5 was obtained. The content ratio of P/TFE of the fluorinated polymer 5 was 0.33 based on mass.

The number average molecular weight and the weight average molecular weight of the obtained fluorinated polymer 5 were measured by the above described method for measuring the molecular weight. The weight average molecular weight (Mw) was 6,260, the number average molecular weight (Mn) was 5,010, and the molecular distribution Mw/Mn was 1.25.

Preparation Example 6

The polymerization was carried out in the same manner as in Preparation Example 4, except that the amount of C4I2 to be charged was changed to 4.5 g, and 19.0 g of a fluorinated polymer C2 was obtained. The content ratio P/TFE of the fluorinated polymer C2 was 0.33 based on mass.

The number average molecular weight and the weight average molecular weight of the obtained fluorinated polymer C2 were measured by the above described method for measuring molecular weight. The weight average molecular weight (Mw) was 3,470, the number average molecular weight (Mn) was 2,940, and the molecular weight distribution Mw/Mn was 1.18.

Example 1

0.04 g of bis(perfluorobenzoyl) peroxide (PFBPO) as the radical generator and 0.13 g of triallyl isocyanurate (TAIC) as the crosslinking coagent were added and mixed to 1.0 g of the fluorinated polymer 1 obtained in Preparation Example 1 to prepare an adhesive sample 1.

The adhesive strength of the obtained adhesive sample 1 was measured by the above described method, and as a result, the adhesive strength was 165 N.

Further, the evaluation result of the heat resistance test was A.

Example 2

0.04 g of PFBPO as the radical generator and 0.26 g of TAIC were added and mixed to 1.0 g of the fluorinated polymer 1 obtained in Preparation Example 1 to prepare an adhesive sample 2.

The adhesive strength of the obtained adhesive sample 2 was measured by the above method, and as a result, the adhesive strength was 189 N.

Further, the evaluation result of the heat resistance test was A.

Example 3

0.04 g of PFBPO as the radical generator and 0.26 g of TAIC were added and mixed to 1.0 g of the fluorinated polymer 2 obtained in Preparation Example 2 to prepare an adhesive sample 3.

The adhesive strength of the obtained adhesive sample 3 was measured by the above method, and as a result, the adhesive strength was 205 N.

Further, the evaluation result of the heat resistance test was A.

Example 4

0.04 g of benzoylperoxide (BPO) as the radical generator and 0.20 g of triallyl isocyanurate (TAIC) as the crosslinking coagent were added and mixed to 1.0 g of the fluorinated polymer 4 obtained in Preparation Example 4 to prepare an adhesive sample 4.

The adhesive strength of the obtained adhesive sample 4 was measured by the above method, and as a result, the adhesive strength was 210 N.

Further, the evaluation result of the heat resistance test was A.

Example 5

0.04 g of BPO as the radical generator and 0.20 g of TAIC as the crosslinking coagent were added and mixed to 1.0 g of the fluorinated polymer 5 obtained in Preparation Example 5 to prepare an adhesive sample 5.

The adhesive strength of the obtained adhesive sample 5 was measured by the above method, and as a result, the adhesive strength was 190 N.

Further, the evaluation result of the heat resistance test was A.

Comparative Example 1

0.04 g of PFBPO as the radical generator and 0.26 g of TAIC were added and mixed to 1.0 g of the fluorinated polymer C1 obtained in Preparation Example 3 to prepare an adhesive sample C1.

The adhesive strength of the obtained adhesive sample C1 was measured by the above method, and as a result, the adhesive strength was 120 N.

Further, the evaluation result of the heat resistance test was A.

Comparative Example 2

0.04 g of BPO as the radical generator and 0.20 g of TAIC were added and mixed to 1.0 g of the fluorinated polymer C2 obtained in Preparation Example 6 to prepare an adhesive sample C2.

The adhesive strength of the obtained adhesive sample C2 was measured by the above method, and as a result, the adhesive strength was 110 N.

Further, the evaluation result of the heat resistance test was A.

INDUSTRIAL APPLICABILITY

The adhesive comprising a fluorinated polymer having a specific weight average molecular weight and having iodine atoms at both terminals, and a radical generator is very useful in industries as an adhesive excellent in heat resistance and adhesive property.

This application is a continuation of PCT Application No. PCT/JP2014/079118, filed on Oct. 31, 2014, which is based upon and claims the benefit of priority from Japanese Patent Application No. 2013-229229 filed on Nov. 5, 2013. The contents of those applications are incorporated herein by reference in their entireties.

What is claimed is:

1. An adhesive comprising: a fluorinated polymer having a weight average molecular weight (Mw) of from $1.4 \times 10^4$ to $2 \times 10^4$ and having iodine atoms at both terminals; and a radical generator, wherein a ratio of the weight average molecular weight (Mw) to the number average molecular weight (Mn) of the fluorinated polymer is from 1.00 to 1.35, and an amount of the radical generator is from 0.5 to 5.0 mass % with respect to 100 mass % of the adhesive.

2. The adhesive according to claim 1, wherein the fluorinated polymer comprises structural units derived from at least one monomer selected from the group consisting of tetrafluoroethylene, vinylidene fluoride, hexafluoropropylene and a perfluoro(alkyl vinyl ether).

3. The adhesive according to claim 1, wherein the fluorinated polymer comprises structural units derived from vinylidene fluoride and structural units derived from hexafluoropropylene, and the content ratio (HFP/VdF) of the structural units derived from hexafluoropropylene to the structural units derived from vinylidene fluoride is from 0.4 to 1.0 based on mass.

4. The adhesive according to claim 1, wherein the fluorinated polymer comprises structural units derived from tetrafluoroethylene and structural units derived from propylene, and the content ratio (P/TFE) of the structural units derived from propylene to the structural units derived from tetrafluoroethylene is from 0.2 to 1.0 based on mass.

5. The adhesive according to claim 1, further comprising a compound having at least 2 ethylenic unsaturated bonds.

6. The adhesive according to claim 1, wherein the content of a volatile component in the adhesive is at most 50 mass %.

7. The adhesive according to claim 1, wherein the adhesive is suitable for bonding metals.

8. A method for bonding a first member and a second member, comprising:
applying the adhesive as defined in claim 1 between the first member and the second member to obtain a laminate; and
subjecting the obtained laminate to heat treatment.

9. A method for producing an adhered body, comprising:
applying the adhesive as defined in claim 1 between a first member and a second member to obtain a laminate; and
subjecting the obtained laminate to heat treatment to obtain the adhered body.

10. The adhesive according to claim 1, wherein the radical generator is at least one selected from the group consisting of bis(perfluorobenzoyl) peroxide, 1,1-bis(tert-butylperoxy)-3,5,5-trimethylcyclohexane, 2,5-dimethylhexane-2,5-dihydroxy peroxide, di-tert-butyl peroxide, tert-butylcumyl peroxide, dicumyl peroxide, α,α'-bis(tert-butylperoxy)-p-diisopropylbenzene, 2,5-dimethyl-2,5-bis(tert-butylperoxy)hexyne-3, benzoyl peroxide, tert-butylperoxybenzene, 2,5-dimethyl-2,5-bis(benzoylperoxy)hexane, tert-butylperoxy maleic acid, tert-butylperoxyisopropylcarbonate, peracetic acid and m-chloroperbenzoic acid.

11. The adhesive according to claim 10, wherein the adhesive further comprises a crosslinking coagent which is at least one selected from the group consisting of triallyl cyanurate, triallyl isocyanurate, triacryl formal, triallyl trimellitate, N,N'-m-phenylene bismaleimide, dipropargyl terephthalate, and tetraallyl terephthalamide.

12. The adhesive according to claim 1, wherein the content of fluorine atoms in the fluorinated polymer is from 20 to 75 mass %.

13. The adhesive according to claim 1, wherein the content of fluorine atoms in the fluorinated polymer is from 30 to 75 mass %.

14. The adhesive according to claim 1, wherein the content of a volatile component in the adhesive is at most 30 mass %.

15. The adhesive according to claim 1, wherein the content of a volatile component in the adhesive is at most 10 mass %.

16. The adhesive according to claim 1, wherein the fluorinated polymer is a straight-chain polymer having one iodine atom at each of both terminals.

17. The adhesive according to claim 16, wherein the adhesive further comprises a crosslinking coagent which is at least one selected from the group consisting of triallyl cyanurate, triallyl isocyanurate, triacryl formal, triallyl trimellitate, N,N'-m-phenylene bismaleimide, dipropargyl terephthalate, and tetraallyl terephthalamide.

18. The adhesive according to claim 1, wherein the adhesive further comprises a crosslinking coagent which is at least one selected from the group consisting of triallyl cyanurate, triallyl isocyanurate, triacryl formal, triallyl trimellitate, N,N'-m-phenylene bismaleimide, dipropargyl terephthalate, and tetraallyl terephthalamide.

* * * * *

UNITED STATES PATENT AND TRADEMARK OFFICE
CERTIFICATE OF CORRECTION

PATENT NO. : 10,253,221 B2
APPLICATION NO. : 15/068725
DATED : April 9, 2019
INVENTOR(S) : Atsushi Funaki et al.

Page 1 of 1

It is certified that error appears in the above-identified patent and that said Letters Patent is hereby corrected as shown below:

On the Title Page

Item (73), should read:
--AGC Inc., Chiyoda-ku (JP)--

Signed and Sealed this
Twenty-first Day of April, 2020

Andrei Iancu
*Director of the United States Patent and Trademark Office*